W. H. BINES.
JOURNAL BOX FOR MINING CARS.
APPLICATION FILED JUNE 4, 1908.

948,003.

Patented Feb. 1, 1910.

2 SHEETS—SHEET 1.

Witnesses
M. E. Fowler
James R. Mansfield

Inventor
William H. Bines
By Alexander & Dowell
Attorneys

W. H. BINES.
JOURNAL BOX FOR MINING CARS.
APPLICATION FILED JUNE 4, 1908.
948,003.
Patented Feb. 1, 1910.
2 SHEETS—SHEET 2.
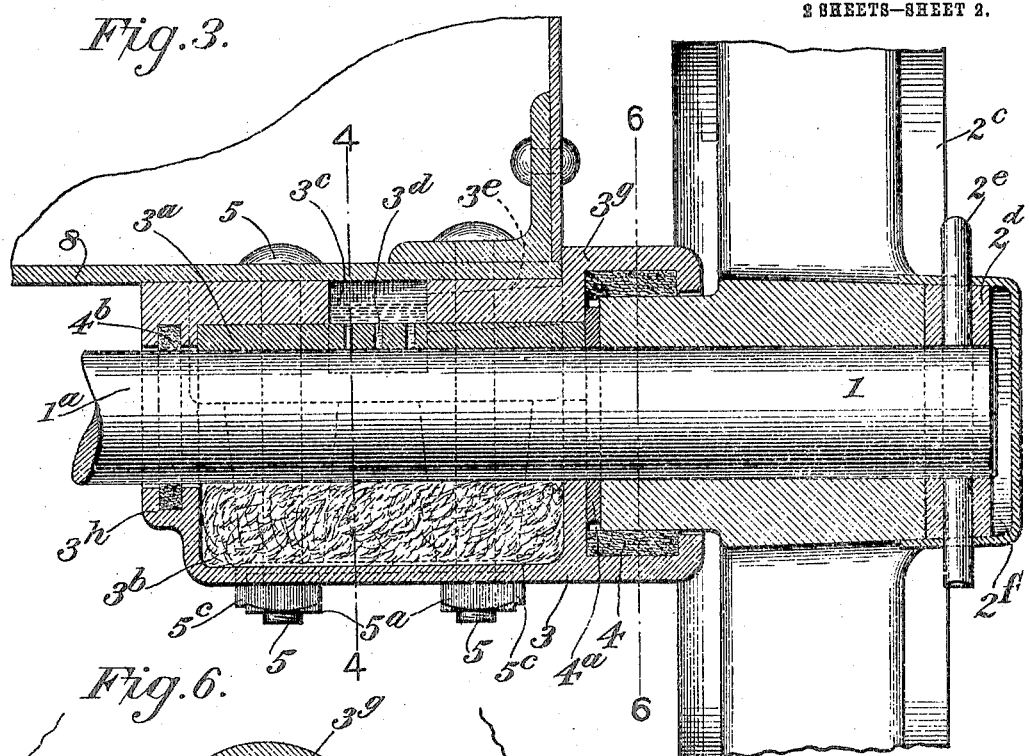
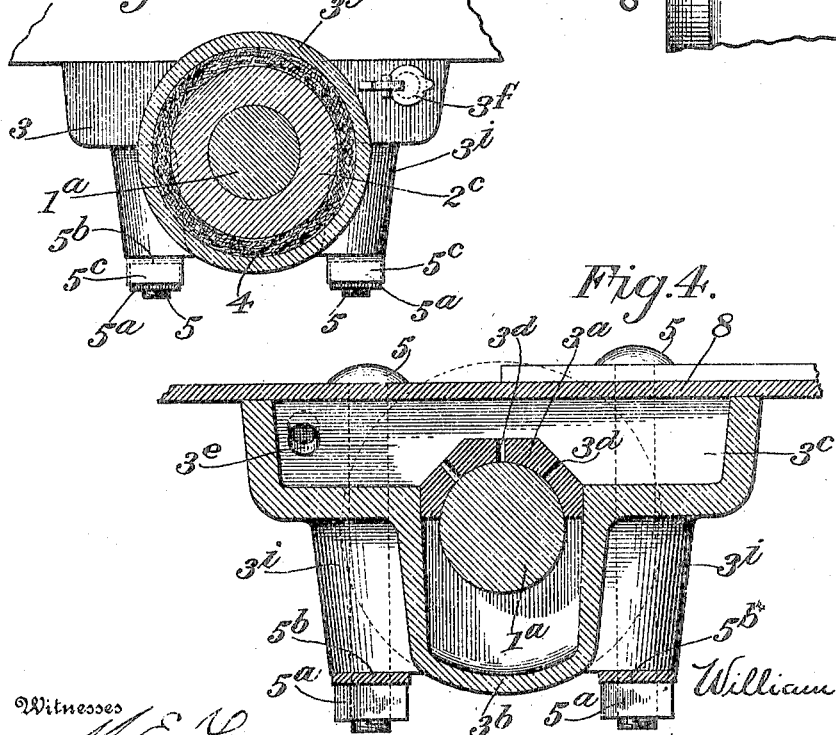
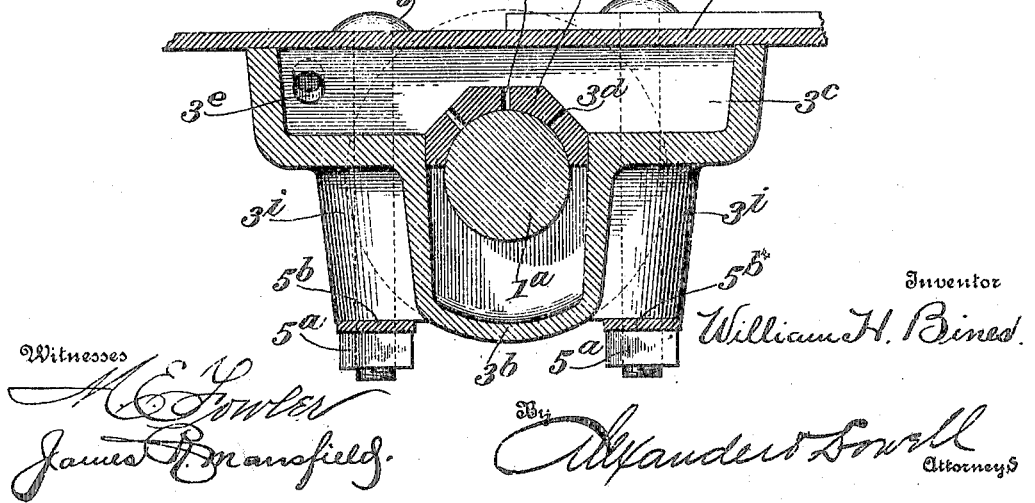
Witnesses
M. E. Fowler
James R. Mansfield
Inventor
William H. Bines
By Alexander Lowell
Attorneys

UNITED STATES PATENT OFFICE.

WILLIAM HOLLAND BINES, OF BARNESVILLE, OHIO, ASSIGNOR TO THE WATT MINING CAR WHEEL COMPANY, OF BARNESVILLE, OHIO, A CORPORATION OF OHIO.

JOURNAL-BOX FOR MINING-CARS.

948,003.  Specification of Letters Patent.  Patented Feb. 1, 1910.

Application filed June 4, 1908. Serial No. 436,713.

*To all whom it may concern:*

Be it known that I, WILLIAM HOLLAND BINES, of Barnesville, in the county of Belmont and State of Ohio, have invented certain new and useful Improvements in Journal-Boxes for Mining-Cars; and I hereby declare that the following is a full, clear, and exact description thereof, reference being had to the accompanying drawings, which form part of this specification.

This invention relates to mining cars, and has particular reference to the running gear thereof; and its objects are to provide an improved self-oiling dust-proof journal-box for the axle journals, whereby all the bearing parts will be protected from grit and dirt; and to improve the general construction and combination of the wheels, axle, journal-boxes and body of such cars.

The several features of construction and arrangement of parts embodying the invention will be hereinafter explained in detail with reference to the accompanying drawings; and the parts and combination of parts for which protection is desired are set forth in the claims.

Figure 1:
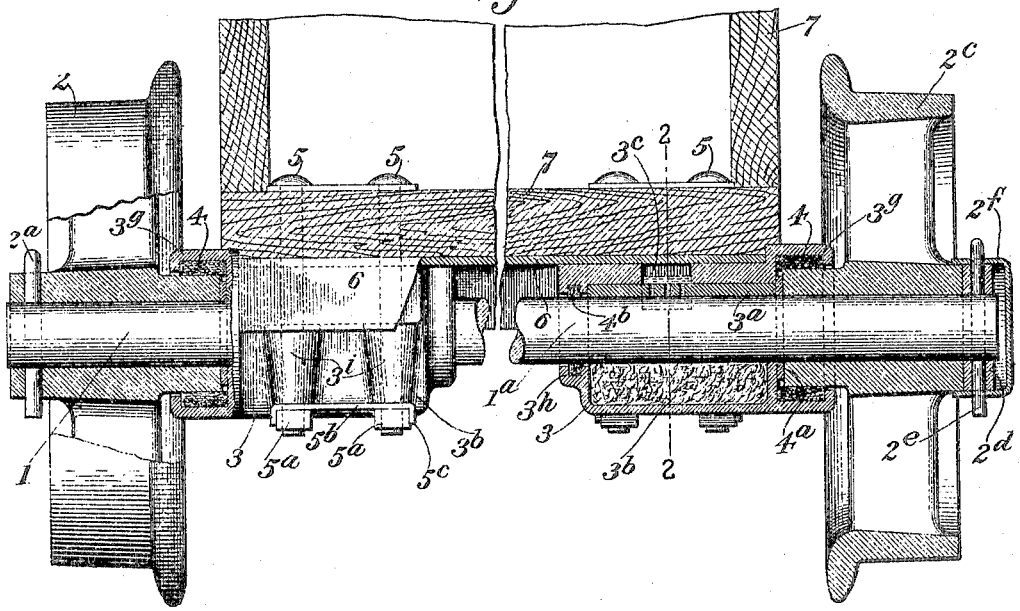
Figure 2:
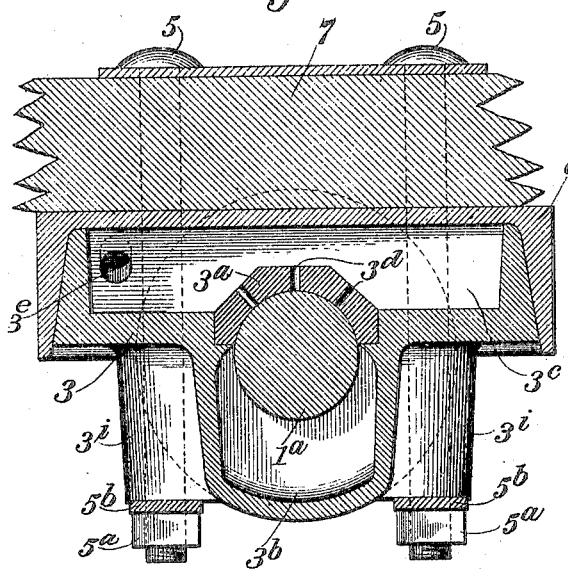
Figure 5:
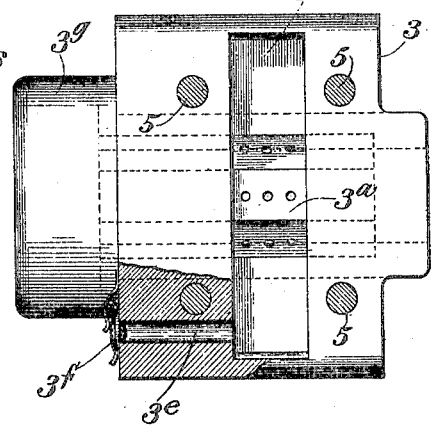

In the drawings: Figure 1 is a detail vertical transverse sectional view of part of a wooden body car in the plane of one of the axles, immaterial parts being broken away, and showing the right-hand journal-box and wheels in section, the right-hand wheel being shown as loose on the axle and the left-hand wheel as fast thereon. Fig. 2 is a vertical section on line 2—2, Fig. 1. Fig. 3 is a vertical sectional view of the journal box and wheel as applied to a steel-bottom car. Fig. 4 is a section on line 4—4, Fig. 3. Fig. 5 is a plan view of one of the journal-boxes detached from the car-body; and Fig. 6 is a vertical sectional view on line 6—6, of Fig. 3.

Each car axle 1 is carried by wheels, which may be of ordinary construction. These wheels may be either fast or loose upon the axle, but preferably I have one wheel fast and the other loose, and thus, as shown in Fig. 1, the left-hand wheel 2 is made fast to the axle by means of a pin or cotter $2^a$ driven through the hub and axle as shown. The wheel may be made fast on the axle in any other desired manner. The right-hand wheel $2^c$ is shown as loose on the axle, but is kept in position thereon by means of a collar $2^d$, secured to the axle by a pin or cotter $2^e$, or any other suitable manner, the outer end of the hub of the wheel bearing against this collar. If desired a cup-shaped dust-cap $2^f$ may be secured to the collar $2^d$ by the pin $2^e$, as shown in Fig. 1, the inner end of this cap extending across the space between the meeting ends of the wheel hub and collar, as shown.

The axle 1 is provided with journals $1^a$ adjacent the wheels, which journals pass through journal boxes 3 which are provided at top with removable brasses, or Babbitt bearing plates $3^a$, which rest upon the top of the shaft and support the journal boxes and weight of the car mounted thereon. Each box 3 is provided below the brass and shaft, with an oil cellar $3^b$, which may be packed with wool waste to supply oil to the under side of the axle by capillary attraction when the oil supply for any reason is allowed to run low; and above the brass is a transverse oil reservoir $3^c$ from which the oil can pass into the oil cellar through apertures $3^d$ in the brass $3^a$; thus oil can be constantly supplied to the axle journal both at top and bottom. The reservoir $3^c$ can be filled with oil through a passage $3^e$ which is formed in the upper side of the journal box and extends to the outer end thereof as shown in Figs. 3 and 4, and which is preferably closed at its outer end by means of a spring-cap $3^f$, which automatically closes the oil reservoir. The journal-box moreover is provided on its outer end with an annular internally recessed flange $3^g$ which embraces the inner end of the hub of the wheel, and a felt ring 4 is placed in the recess of this flange and contacts with the exterior surface of the end of the adjacent wheel hub so as to prevent entry of dust into the journal-box. A washer $4^a$ may be interposed between the outer end of the journal-box and the inner end of the wheel hub as shown. The inner end of the journal-box is provided with an internally channeled annular flange $3^h$ in which is placed a felt ring $4^b$ which surrounds the axle and prevents entry of dust into the inner end of the box. The journal-box is provided on its opposite sides with perforated ears or lugs $3^i$ for the passage of securing bolts 5 by which it is attached to the car body or truck-beam.

Figs. 1 and 2 show the parts as used with a wooden car. In this case the adjacent boxes 3 on the axle are connected and spaced apart by a rolled structural iron channel bar, or beam 6, which also forms the top of the oil reservoir and closes same as shown. And in this case the depending side flanges of the channel-bar embrace the outer sides of the journal-box, and thus relieve bolts 5 of lateral strain. Upon the channel-bar 6 the wooden body 7 of the car is mounted, and the bolts 5 transfix the journal-boxes and channel-bar and the bottom of the car body as shown, and thus bind the whole securely together. As shown bolts 5 have nuts 5$^a$ on their lower ends, and these are prevented from loosening by means of locking plates 5$^b$ transfixed by the bolts and having their ends 5$^c$ upturned against the nuts, thereby forming a positive nut lock, preventing loosening of the nuts.

Figs. 3 and 4 show the invention as used with a car having a steel or iron bottom. In such cases the beam 6 can be dispensed with and the journal-boxes 3 can be fastened direct to the steel bottom 8 of the car, as shown, said car bottom forming the covering or top of the oil reservoir 3$^c$.

It will be observed that in this invention the axle is rotatable, and though I prefer to have at least one of the wheels loose on the axle, such loose wheel has no motion with regard to the axle except when turning curves, and consequently there is practically no wear between the wheel and axle. The axle journal-bearings are well protected from dust; they come directly under the load; they are thoroughly lubricated, and the ample oil reservoirs are located in the best position to insure constant lubrication of the wearing parts.

Having described my invention what I claim as new and desire to secure by Letters Patent is:

1. The combination of a wheeled axle, a journal-box adjacent each wheel having a transverse oil reservoir above the axle journal, an oil cellar below the journal; with removable bearing plates interposed between the top of the box and the axle, a channel-bar resting upon the tops of the boxes and rigidly connecting them and also closing the oil reservoirs, the flanges of said bar preventing lateral displacement of the boxes.

2. In combination, a wheeled axle, journal boxes on the axle journals adjacent the wheels, each box having a transverse oil reservoir above the axle, an oil cellar below the axle, and annular channeled flanges at each end, with dust excluding devices in said flanges at the ends of the box; an inverted channel-bar supported upon the boxes and closing the upper ends of the oil reservoir, and bolts transfixing the box and bar, substantially as described.

3. In combination a wheeled axle, journal-boxes surrounding the axle journals, each box having a transverse oil reservoir in its upper part open at top and supplying oil to the upper side of the journal, an oil cellar below the journal, and an oil supply channel leading into the oil reservoir; with a removable perforated bearing plate resting upon the top of the box and closing the oil cellar, a metal plate extending between and over the journal boxes and closing the oil reservoirs therein and means rigidly securing the boxes to said plate.

4. In combination a wheeled axle, journal boxes surrounding the axle journals adjacent the wheels, each box having a transverse oil reservoir in its upper part supplying oil to the upper side of the journal, an oil cellar below the journal, and an oil supply channel leading into the transverse oil reservoir; with a removable perforated bearing plate interposed between the top of the box and the journal and closing the oil cellar, a rigid top plate overlying the two boxes and closing the oil reservoir thereof, and bolts transfixing said box and plate and securing the boxes rigidly to the plate, substantially as described.

5. In combination an axle, wheels on opposite ends thereof, and journal boxes on the axle journals adjacent the wheels, each box having a transverse oil reservoir above the axle open at top, an oil cellar below the axle, perforated eyes at each side of the cellar for the passage of receiving bolts, and annular channeled flanges at each end surrounding the journals, dust excluding devices in said flanges, and a rigid connecting bar overlying both boxes, said bar closing the oil reservoirs and bolts transfixing the boxes and bar and securing the boxes to the bar.

In testimony that I claim the foregoing as my own, I affix my signature in presence of two witnesses.

WILLIAM HOLLAND BINES.

Witnesses:
W. F. SMITH,
C. J. HOWARD.